US011095509B2

United States Patent
Mansouri Rad

(10) Patent No.: US 11,095,509 B2
(45) Date of Patent: Aug. 17, 2021

(54) METHOD AND APPARATUS FOR INTERDEPENDENT CONTROL OF AMPLIFICATION AND SWITCHING STATE IN A PHOTONIC SWITCH

(71) Applicant: Mohammad Mehdi Mansouri Rad, Kanata (CA)

(72) Inventor: Mohammad Mehdi Mansouri Rad, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/567,343

(22) Filed: Sep. 11, 2019

(65) Prior Publication Data

US 2021/0075674 A1    Mar. 11, 2021

(51) Int. Cl.
*H04Q 11/00* (2006.01)
*H04L 12/24* (2006.01)
*H04B 10/079* (2013.01)

(52) U.S. Cl.
CPC ..... *H04L 41/0816* (2013.01); *H04B 10/0793* (2013.01); *H04B 10/07953* (2013.01); *H04L 41/0806* (2013.01); *H04Q 11/0066* (2013.01); *H04Q 2011/0073* (2013.01); *H04Q 2011/0081* (2013.01)

(58) Field of Classification Search
CPC .... H04J 14/0212; H04J 14/0221; H04J 14/02; H01S 2301/04; H01S 3/10015; H01S 3/13013; H04B 10/07955; H04B 10/07957; H04B 10/2942; H04B 10/296
See application file for complete search history.

(56) References Cited

U.S. PATENT DOCUMENTS

| 6,330,378 B1* | 12/2001 | Forrest | G02B 6/12002 |
| | | | 372/50.21 |
| 7,715,092 B2* | 5/2010 | Bolshtyansky | H04B 10/296 |
| | | | 359/334 |
| 7,873,274 B2* | 1/2011 | Collings | H04B 10/275 |
| | | | 398/37 |
| 8,218,967 B1 | 7/2012 | Stevens | |

(Continued)

FOREIGN PATENT DOCUMENTS

JP    2017168916 A    9/2017

OTHER PUBLICATIONS

Ripalta Stabile "Towards Large-Scale Fast Reprogrammable SOA-based Photonic Integrated Switch Circuits"; Applied Sciences, 2017, 7, 920.

(Continued)

*Primary Examiner* — Tanya T Motsinger

(57) ABSTRACT

A method and apparatus for controlling an optical switch. The switch includes a switching fabric and optical amplifiers for amplifying optical signals. A configuration for the switching fabric is generated and implemented. The configuration indicates a set of optical paths between switching fabric input ports and the output ports. Optical path losses through the switching fabric vary based on the configuration. An amplifier control signal for controlling gains of the optical amplifiers, is also provided. The configuration for the switching fabric is generated based on the gains of the optical amplifiers, the amplifier control signal is generated based on the configuration for the switching fabric, or both.

20 Claims, 15 Drawing Sheets

(56) References Cited

U.S. PATENT DOCUMENTS

| | | | |
|---|---|---|---|
| 2002/0048066 A1* | 4/2002 | Antoniades | H04J 14/0228 398/82 |
| 2004/0131353 A1* | 7/2004 | Cannon | H04B 10/296 398/1 |
| 2006/0020996 A1* | 1/2006 | Takagi | H04N 21/44209 725/124 |
| 2006/0177229 A1* | 8/2006 | Hilgers | H03F 3/087 398/208 |
| 2007/0291349 A1* | 12/2007 | Zhou | H01S 3/13013 359/333 |
| 2008/0152051 A1* | 6/2008 | Mada | H03G 3/3078 375/345 |
| 2009/0238574 A1 | 9/2009 | Sone | |
| 2010/0123949 A1* | 5/2010 | Naito | H04B 10/2935 359/337.11 |
| 2011/0305459 A1 | 12/2011 | Deore et al. | |
| 2015/0280391 A1* | 10/2015 | Kachita | H01S 3/06758 359/337.11 |
| 2016/0036552 A1 | 2/2016 | Li et al. | |
| 2016/0094307 A1* | 3/2016 | Nakamura | H04B 10/2942 398/26 |
| 2018/0205485 A1* | 7/2018 | Yuki | H04B 10/2942 |
| 2018/0262292 A1* | 9/2018 | Dangui | H04B 10/2916 |
| 2019/0115977 A1* | 4/2019 | Yuki | H04J 14/0221 |
| 2019/0140418 A1* | 5/2019 | Le Taillandier De Gabory | H01S 3/094011 |
| 2019/0165877 A1* | 5/2019 | Way | H04J 14/0212 |
| 2021/0075674 A1* | 3/2021 | Mansouri Rad | H04Q 11/0066 |

OTHER PUBLICATIONS

Russell A. Budd et al "Semiconductor Optical Amplifier (SOA) Packaging for Scalable and Gain-Integrated Silicon Photonic Switching Platforms"; 2015 IEEE 65th Electronic Components and Technology Conference (ECTC).

Ripalta Stabile et al "Integrated optical switch matrices for packet data networks"; Microsystems &Nanoengineering (2016) 2, 15042.

L. Schares et al "A Gain-Integrated Silicon Photonic Carrier with SOA-Array for Scalable Optical Switch Fabric"; OFC 2016.

Yi Quan et al "Scalable Photonic Switch with Crosstalk suppression for Datacenters and Optical Networks"; OFC 2015.

N. Dupuis, et al, "A nonblocking 44 Mach-Zehnder switch with integrated gain and nanosecond-scale reconfiguration time", OFC 2019, Paper W1E.2.

Ryotaro Konoike et al "SOA-Integrated Silicon Photonics Switch and Its Lossless Multistage Transmission of High-Capacity WDM Signals"; Journal of lightwave technology; Jan. 2019.vol. 37, No. 1.

Benjamin Lee et al "Silicon Photonic Switch Fabrics: Technology and Architecture"; Journal of Lightwave Technology; Jan. 2019. vol. 37, No. 1.

* cited by examiner

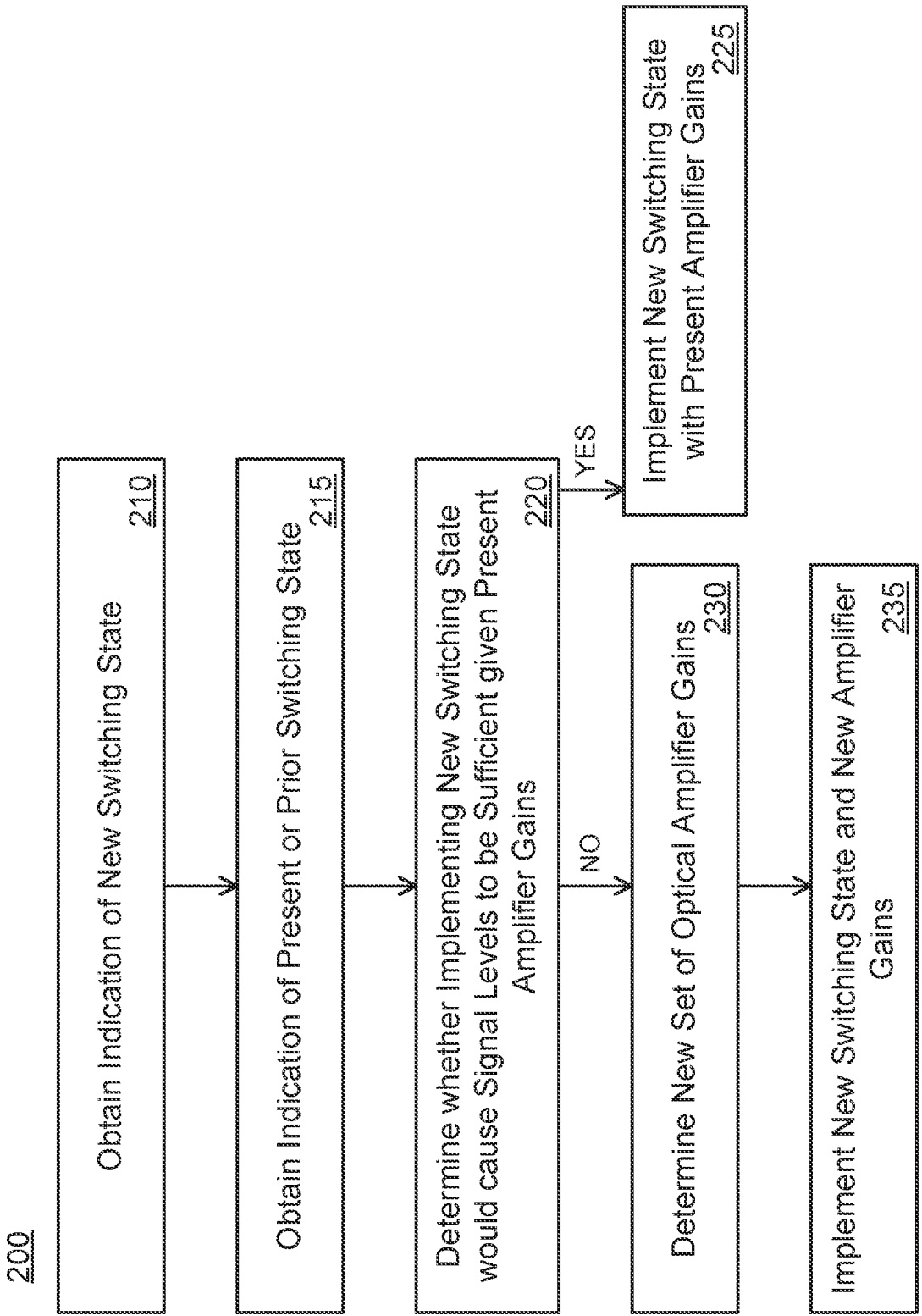

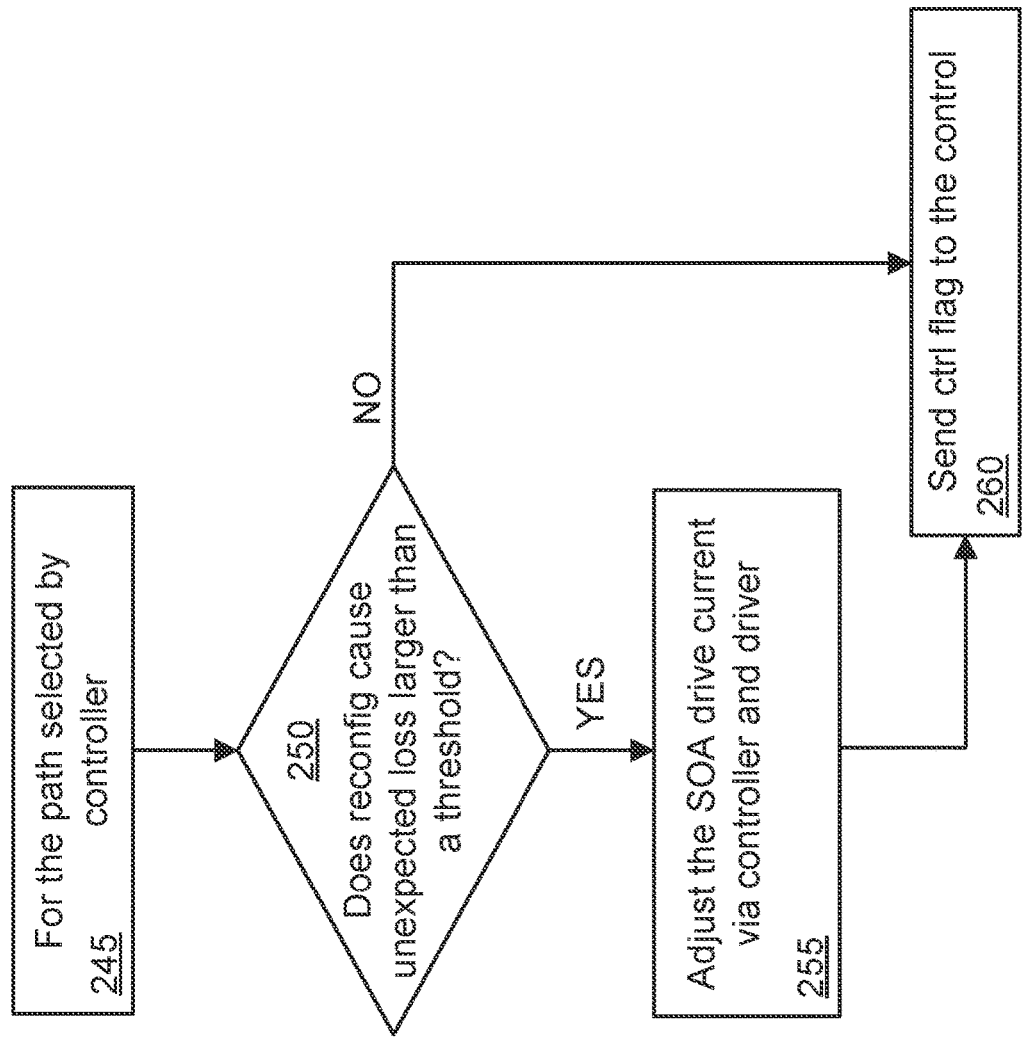

| Current (mA) | Power (dBm) | BER |
|---|---|---|
| 110 | -3 | $<10^{-4}$ |
| 100 | -5 | $<10^{-6}$ |
| 91 | -7 | $<10^{-6}$ |
| 81 | -6.6 | $<10^{-6}$ |
| 71 | -9.5 | $<10^{-6}$ |
| 61 | -13.8 | $<10^{-6}$ |
| <60 | no power | - |

Upper Gain Threshold — 600

BER satisfies desired BER (BER Threshold) of $10^{-6}$ Bit Errors per Unit Time at Maximum

| Current (mA) | Power (dBm) | BER |
|---|---|---|
| >100 | -6 | $>10^{-5}$ |
| 99 | -6.5 | $<10^{-6}$ |
| 90 | -7.6 | $<10^{-6}$ |
| 81 | -9.6 | $<10^{-6}$ |
| 71 | -13.5 | $5*10^{-6}$ |
| <60 | no power | -- |

Upper Gain Threshold — 610

BER satisfies desired BER (BER Threshold) of $10^{-6}$ Bit Errors per Unit Time at Maximum Lower Gain Threshold — 615

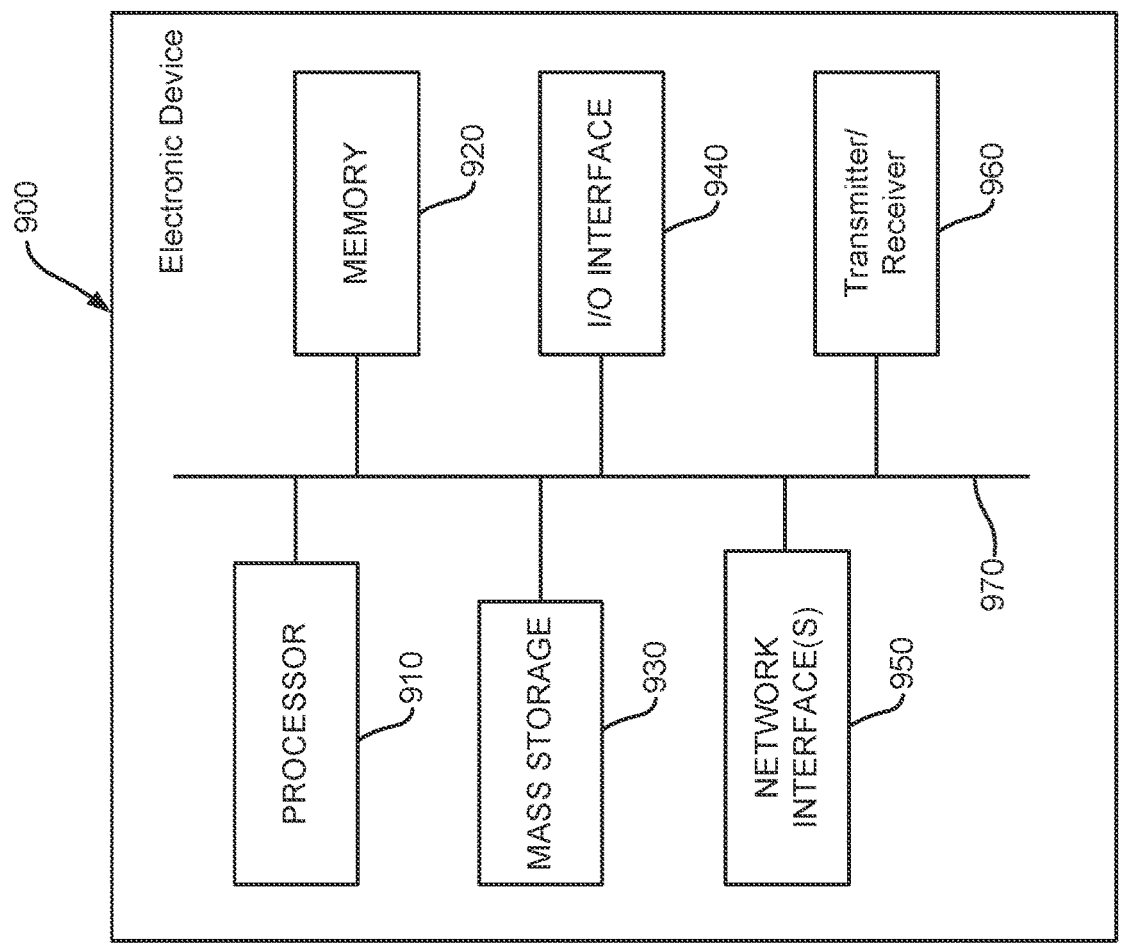

METHOD AND APPARATUS FOR INTERDEPENDENT CONTROL OF AMPLIFICATION AND SWITCHING STATE IN A PHOTONIC SWITCH

CROSS-REFERENCE TO RELATED APPLICATIONS

This is the first application for this technology.

FIELD OF THE INVENTION

The present invention pertains to the field of photonic switches, and in particular to a method and apparatus for controlling optical amplification, switching state, or both, of a photonic switch.

BACKGROUND

Optical switching is a promising technology for supporting high bandwidth and high speed data connectivity requirements, for example in data center and high performance computing applications. In such applications, numerous servers are connected together and exchange significant amount of data (>100 Gbps) at very short time intervals (milliseconds to microseconds).

Various architectures have been proposed and considered for employing fast photonic switching. In practice, this can require the use of optical switches with significant numbers of input and output ports. Higher port counts require larger switches with more complex structures and more stages. Photonic switching technologies silicon-photonics (SiPh), micro-mechanical (MEMS), and liquid-crystal on silicon (LCOS). SiPh technology is a current focus due to advantages in size, cost, and speed.

Larger switches typically include more intermediate stages which optical signals have to pass through. These intermediate stages can be 2×2 switching cells for example employing Mach-Zehnder interferometry to route the optical signal to one output or another. A higher intermediate stage count leads to higher optical signal loss. Optical amplifiers, such as semiconductor optical amplifiers (SOAs) can be used to compensate for such signal loss. SOAs have a high dynamic range in supporting high gains (as high as 20 dB). SOA operation is also simple and their size and complexity make them relatively easy to integrate into a system. The operating gain can be controlled by the drive current of the SOA.

However, although physical integration of SOAs and photonic switches has been performed, these two elements to date have been functionally separate. As such, performance of large switches is still subject to various deficiencies such as fluctuating optical signal levels as the switch is reconfigured. This can lead to problems with switch performance and link budgets.

Therefore there is a need for a method and apparatus for controlling optical amplification, switching state, or both, of a photonic switch that mitigates or obviates one or more limitations in the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for interdependently controlling optical amplification and switching state of a photonic switch.

In accordance with an embodiment of the present invention, there is provided a controller for an optical switch. The optical switch includes a switching fabric controllable to route optical signals from input ports to output ports, and one or more optical amplifiers for amplifying one or more of said optical signals. The controller also includes processing electronics and a control output. The controller is configured to generate a configuration for the switching fabric, the configuration indicating a selected set of optical paths between the input ports and the output ports, wherein optical path losses through the switching fabric vary based on the configuration. The controller is configured to provide, at the control output, a switching fabric control signal for implementing the configuration for the switching fabric. The controller is configured to generate and provide, at the control output, an amplifier control signal for controlling gains of the one or more optical amplifiers. The configuration for the switching fabric is generated based at least in part on the gains of the one or more optical amplifiers, the amplifier control signal is generated based on the configuration for the switching fabric, or both.

In accordance with another embodiment of the present invention, there is provided a method for controlling an optical switch. The optical switch includes a switching fabric controllable to route optical signals from input ports to output ports, and one or more optical amplifiers for amplifying one or more of said optical signals. The method includes generating a configuration for the switching fabric, the configuration indicating a selected set of optical paths between the input ports and the output ports, wherein optical path losses through the switching fabric vary based on the configuration. The method includes providing a switching fabric control signal for implementing the configuration for the switching fabric. The method includes generating and providing an amplifier control signal for controlling gains of the one or more optical amplifiers. The configuration for the switching fabric is generated based at least in part on the gains of the one or more optical amplifiers, the amplifier control signal is generated based on the configuration for the switching fabric, or both.

Embodiments have been described above in conjunctions with aspects of the present invention upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present invention will become apparent from the following detailed description, taken in combination with the appended drawings, in which:

FIG. 2A illustrates a method for controlling optical amplifiers in view of a given switching state, according to an embodiment of the present invention.

FIG. 2B illustrates an implementation of the method of FIG. 2A, according to an embodiment of the present invention.

FIG. 9A illustrates, in tabulated format, experimental results for various drive currents and their respective amplification and error rates in one optical path.

FIG. 9B illustrates, in tabulated format, experimental results for various drive currents and their respective amplification and error rates in another optical path.

FIG. 10 illustrates, in a schematic diagram, an electronic device in accordance with embodiments of the present invention.

It will be noted that throughout the appended drawings, like features are identified by like reference numerals.

DETAILED DESCRIPTION

Figure 1:
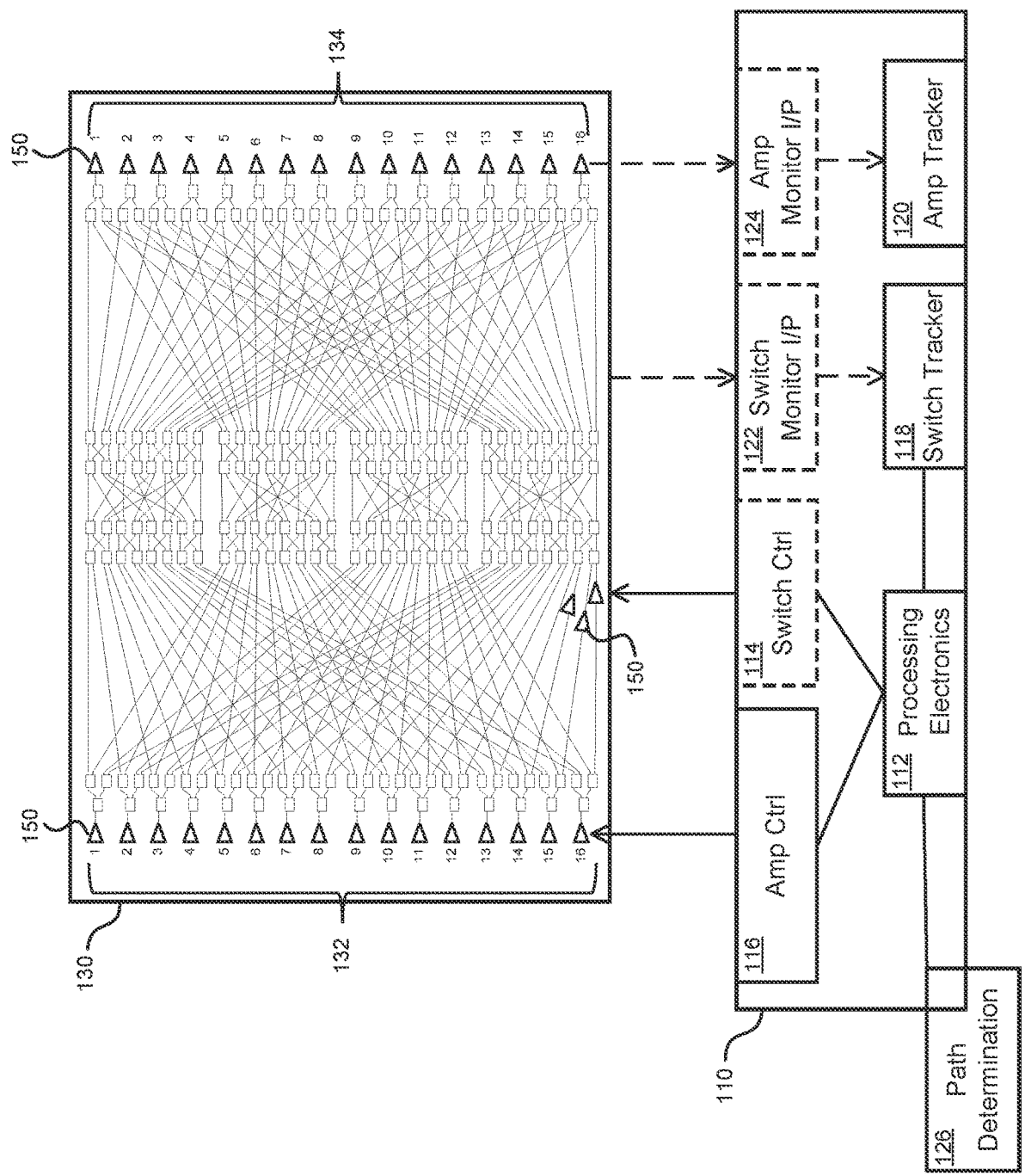
FIG. 1 schematically illustrates a controller operatively coupled to an optical switching fabric and one or more optical amplifiers, in accordance with an embodiment of the present invention.

Embodiments of the present invention provide for an integration of optical amplifier (e.g. SOA) control and switching fabric state control in an optical (photonic) switch. For example, switching state control and amplifier level control can be performed together, one based on the other or both based on each other.

The switching fabric of the optical switch is controllable to route optical signals from selected input ports to selected output ports. For example, signals present at up to N input ports can be controllably routed to selected ones of up to M (typically equal to N) output ports. The routing can be performed by the control of interconnected switching fabric components such as Mach-Zehnder 2×2 switching cells. Each switching cell can be controllably operated in a "bar" or "cross" state, for example. In the "bar" state, a signal present at a first input is routed to a first output, and a signal present at a second input is routed to a second output. In the "cross" state, a signal present at the first input is routed to the second output, and a signal present at the second is routed to the first output. Different optical paths through the switching fabric can pass through different numbers of switching cells and different lengths of interconnecting optical transmission line or waveguide. This results in different levels of optical path loss for the different paths. When the switch is reconfigured, the paths established between input ports and output ports can change. Because there are multiple potential paths between the same input port/output port pair, a path can change even if the input-to-output port mapping is unchanged. A typical optical switch can be reconfigured frequently, to accommodate changing connectivity demands. The changes in signal losses resulting from the changes in optical paths results in fluctuating signal levels being output by the switch. This can be problematic in terms of link budgets, bit error rates, etc.

The optical switch also includes optical amplifiers (e.g. SOAs) coupled to or integrated into the switching fabric. For example, each input port, output port, or both, can be coupled to an optical amplifier. Additionally or alternatively, optical amplifiers can be integrated into intermediate stages of the switching fabric. The optical amplifiers are configured to directly or indirectly amplify optical signals at the switching fabric input ports, output ports, or both.

Embodiments of the present invention provide for a controller operatively coupled to both the switching fabric and the optical amplifiers. The controller monitors one or both of the switching state and the optical amplifier gains. The controller includes processing electronics and outputs for controlling one or both of the switching state and the optical amplifier gains. When the controller directly controls the switching state or the optical amplifier gains, monitoring these can include monitoring the last generated control output for same. When the switching state or optical amplifier gains are controlled by another entity, monitoring these can include receiving and interpreting the control signals from the other entity, or directly monitoring the operation of the switching fabric or optical amplifiers. In one embodiment, the controller monitors the switching state (either internally or via a switching state input) and controls the optical amplifier gains via an amplifier control output. As noted above, optical path losses through the switching fabric vary based on configuration (i.e. switching state) of the switching fabric.

The controller is configured to integrate the control of the switching state and the amplifier gains. In some embodiments, the controller is configured to generate and provide, at the amplifier control output, a control signal for controlling gains of the optical amplifiers, based on the indication of the configuration of the switching fabric. That is, the amplifier gains are adjusted based on the switching state. This allows the optical signal levels to be adjusted when the optical path loss varies due to a change in switching state, thus stabilizing the signal levels.

In further embodiments, the amplifier gains can be updated only when necessary. In particular, if a present amplifier gain is sufficient for adequately compensating for path losses incurred in the switching fabric, the amplifier gain is unchanged. If, however, the amplifier gain is insufficient for such adequate compensation, it can be updated using the control signal. Adequate compensation can be measured in terms of link budget requirements, minimum acceptable signal levels, maximum acceptable bit error rates, or the like.

In some embodiments, the controller is configured to generate and provide, at a switching state control output, a control signal for implementing a new switching state of the optical switching fabric. The new switching state is generated based in part on the gains of the optical amplifiers. In particular, the new switching state is one which connects input ports to output ports in a required pairwise manner, but for which the internal paths are selected so that the path losses are adequately compensated, if possible, by the present gains of the optical amplifiers without changing these gains. If changes to the gains are required, these can be adjusted using the amplifier gain control signals.

FIG. 1 illustrates a controller 110 operatively coupled to an optical switching fabric 130 and one or more optical amplifiers 150, in accordance with an embodiment of the present invention. The optical switching fabric is made up of multiple 1×2 and 2×2 switching cells (rectangles), interconnected by optical signal transmission lines (e.g. waveguides). Although multiple optical amplifiers 150 are shown in different locations, including at the input ports 132, output ports 134, and intermediate locations of the optical switching fabric 130, it should be understood that these locations are shown for example only, and not all of the illustrated optical amplifiers need be present. Only a limited example number of optical amplifiers are shown at intermediate locations, for clarity, however it should be understood that further such optical amplifiers may also be present.

The controller 110 includes processing electronics 112, and one or both of a switching state control output 114 and amplifier gain control outputs 116. The controller 110 further includes a switching state tracker 118 for tracking a present switching state of the switching fabric 130 and an amplifier gain tracker 120 for tracking a present set of gains of the optical amplifiers 150. The controller 110 may further include a switching state monitoring input 122 for receiving a signal indicative of the present switching state of the switching fabric, for use in updating the switching state tracker 118. The controller 110 may further include an amplifier monitoring input 124 for receiving a signal indicative of the present gains of the optical amplifiers 150, for use in updating the amplifier gain tracker 120. The monitoring inputs may be omitted if the controller internally generates and tracks the switching states and amplifier gains.

A path determination unit 126, which may either be part of the controller 110 or separate from but operatively coupled to the controller, may also be provided. The path determination unit 126 determines, for example via calculation using a processor or other components, or via lookup table, etc. the optical path or paths to be established through the switching fabric, given current port-to-port connectivity requirements. The output of the path determination unit 126 may specify or be used to specify the desired next switching state of the switching fabric 130.

FIG. 2A illustrates a method 200 for controlling optical amplifiers, which may also be a process performed by the controller 110, according to an embodiment of the present invention. The method 200 includes obtaining 210 an indication of a new switching state of the switching fabric. This may include determining the new switching state, for example in order to satisfy port-to-port connectivity demands for the optical switch. The method may further include obtaining 215 an indication of a present or prior switching state of the switching fabric, for comparison. This may be a switching state previously selected by the controller itself and obtained from the switching state tracker 118. The method further includes determining 220 whether implementing the new switching state would cause optical signal levels output by the switch to be sufficient given the current gains of the optical amplifiers. This determination may involve comparing the present or prior switching state with the new switching state, for example. The method further includes, when implementing the new switching state would cause optical signal levels output by the switch to be sufficient given the current gains of the optical amplifiers, implementing 225 the new switching state. The method further includes, when implementing the new switching state would cause optical signal levels output by the switch to be insufficient given the current gains of the optical amplifiers, determining 230 a new set of optical amplifier gains that would cause the optical signal levels to be sufficient, and implementing 235 the new switching state and the new set of optical amplifier gains.

In some embodiments, determining 220 whether implementing the new switching state would cause optical signal levels output by the switch to be sufficient includes determining whether the switching state reconfiguration would result in a signal loss level or bit error rate that is larger than a given threshold. The threshold may be a 3 dB threshold, for example, or a smaller or larger threshold. A threshold of 0 is also possible, i.e. meaning that any level of loss signal requires drive current compensation. The threshold can be arbitrarily small or arbitrarily large, depending on the requirements of the situation.

The method 200 may be performed on a path-by-path basis, including the optical amplifiers associated with those paths, or it may be performed for multiple paths at a time, or all of the switching fabric and optical amplifiers.

FIG. 2B illustrates a method 240, which is related to the method 200, and which is provided according to another embodiment of the present invention. This method is a control routine to manage reconfiguration during switching. First, a path and a corresponding an optical switching fabric reconfiguration are determined 245 by the controller. The path may correspond to a set of optical paths through the switching fabric for coupling designated input ports to designated output ports according to a given requirement. For this determined path, a determination 250 is made as to whether the optical switching fabric reconfiguration causes optical losses larger than a predetermined threshold. The threshold can be for example 3 dB. If the determination 250 is that there is no such loss, a control flag 260 is sent to the controller, indicating that amplifier (SOA) adjustment is not necessary and that current drive levels can be maintained. If the determination is that there is such a loss, the amplifier gain levels (SOA drive current) is adjusted 255 via the controller and the amplifier drivers. The control flag 260 is then sent to the controller, indicating the new current drive levels reflecting the adjustment.

In some embodiments, the controller is configured with information such as link budget requirements 460 within the switching fabric and/or the optical communication link in general; present and potential optical amplifier gains 462; communication system performance requirements 464 (such as optical signal-to-noise ratio OSNR); and optical specifications of the transceiver 466. The controller can be configured to dynamically adjust the operating point of the system, particularly the amplifier gain, in order to maintain adequate communication reliability in response to changing state of the switching fabric. The loss threshold may be set based on the link budget requirements, performance requirements, or other characteristics.

In some embodiments, the controller is configured to determine the state of the switching fabric based at least in part on the present optical amplifier gains. The state of the switching fabric can include a specification of the set of optical path through the switching fabric which satisfy a desired connectivity requirement for optically coupling specified input ports to specified output ports of the switch. As will be readily understood, there are multiple different possible sets of optical paths satisfying a particular connectivity requirement. Each of these will be associated with a different optical path loss profile. The controller can therefore select one of the possible sets of optical paths which presents a loss profile that is acceptable given the present optical amplifier gains or cause a minimal change in amplifier gain settings. In some embodiments, knowing the desired connectivity requirement, the controller can employ link budget information and amplifier state information to select a set of optical paths which requires no adjustment to amplifier gains, or at least limited or minimal adjustment to the amplifier gains. Such a determination may involve trade-offs between other parameters such as crosstalk of the switch, insertion loss, blocking issues, etc.

As such, in some embodiments, for a given path loss threshold, which is set in part based on the present optical amplifier gains, and potentially other considerations such as overall link budget or bit error rate requirement, the controller can determine a new set of optical paths which satisfy the given path loss threshold. For example, given limitations of the optical amplifiers (e.g. SOAs), an optical path or set of optical paths through the switching fabric can be determined which provides adequate performance. As a more particular example, optical paths can be selected that limit or minimize the control changes required in the optical amplifiers. These optical paths also satisfy given port-to-port connectivity requirements. For a given loss threshold, for example dictated by the present optical amplifier gains, new optical paths can be determined which result in optical losses being below a predetermined threshold.

Figure 2C:
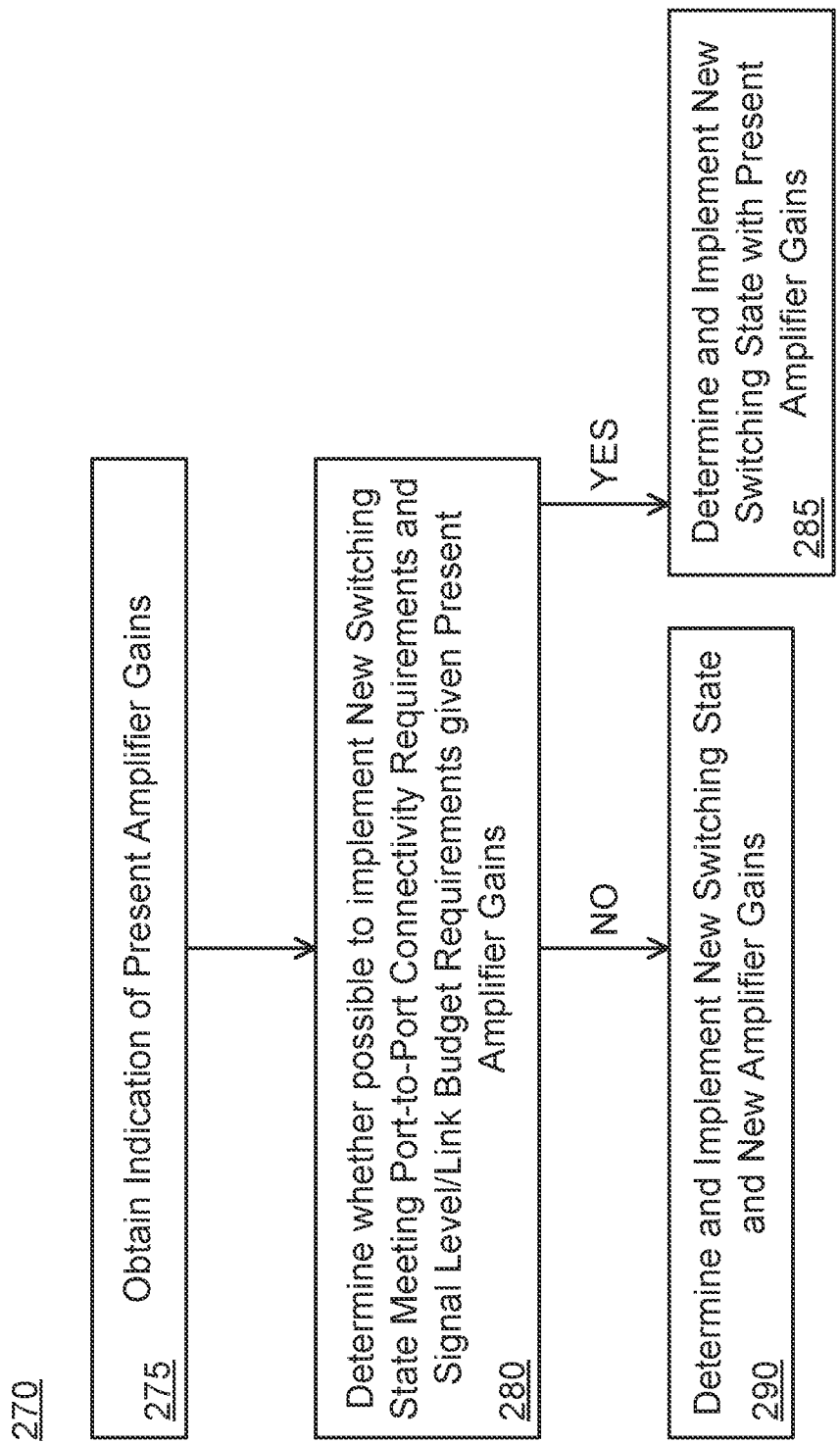
FIG. 2C illustrates another method for controlling optical amplifiers in view of a given switching state, according to another embodiment of the present invention.

FIG. 2C illustrates a corresponding method 270 for controlling optical amplifiers, which may also be a process performed by the controller 110, according to an embodiment of the present invention. In this case, the switching state is determined based at least in part on the present amplifier gains. As such, an indication of the present amplifier gains is determined 275, for example by obtaining information from memory or the current controller state. A determination 280 is then made as to whether it is possible to implement a new switching state meeting port-to-port connectivity requirements and signal level or link budget requirements, given the present amplifier gains. The new switching state may be a switching fabric configuration resulting in optical paths connecting input ports to output ports, according to the port-to-port connectivity requirements. If such an implementation is possible, the new switching state is determined and implemented 285, with amplifier gains unchanged. Otherwise, the new switching state and a new set of amplifier gains are determined and implemented 290 together. In some embodiments, the determination may involve limiting or minimizing the amount of change to the amplifier gains, if possible.

Embodiments of the present invention involve photonic switches in which optical amplifier narrowband filtering is omitted. Optical amplifiers such as SOAs, can boost optical signals in order to compensate for signal losses in the switching fabric. In telecommunications applications, the narrowband optical filter can be coupled to the optical amplifier, in order to mitigate the introduction of noise, particularly amplified spontaneous emission (ASE) noise. However, such optical filters are not necessarily practical (e.g. due to cost and complexity) in other applications such as high-performance computing and data centre applications. In this case, embodiments of the present invention compensate for the lack of a signal filter by actively integrating the control of switching state and amplifier gain, for example as described above. ASE noise in such applications can degrade communication performance, measured in bit error rate, and hence impact the link budget of the overall photonic system. Optical amplifiers can therefore be adjusted to maintain link budget requirements, for example when port-to-port mappings of the switching fabric change, which may be done on a frame-by-frame basis.

Figure 3:
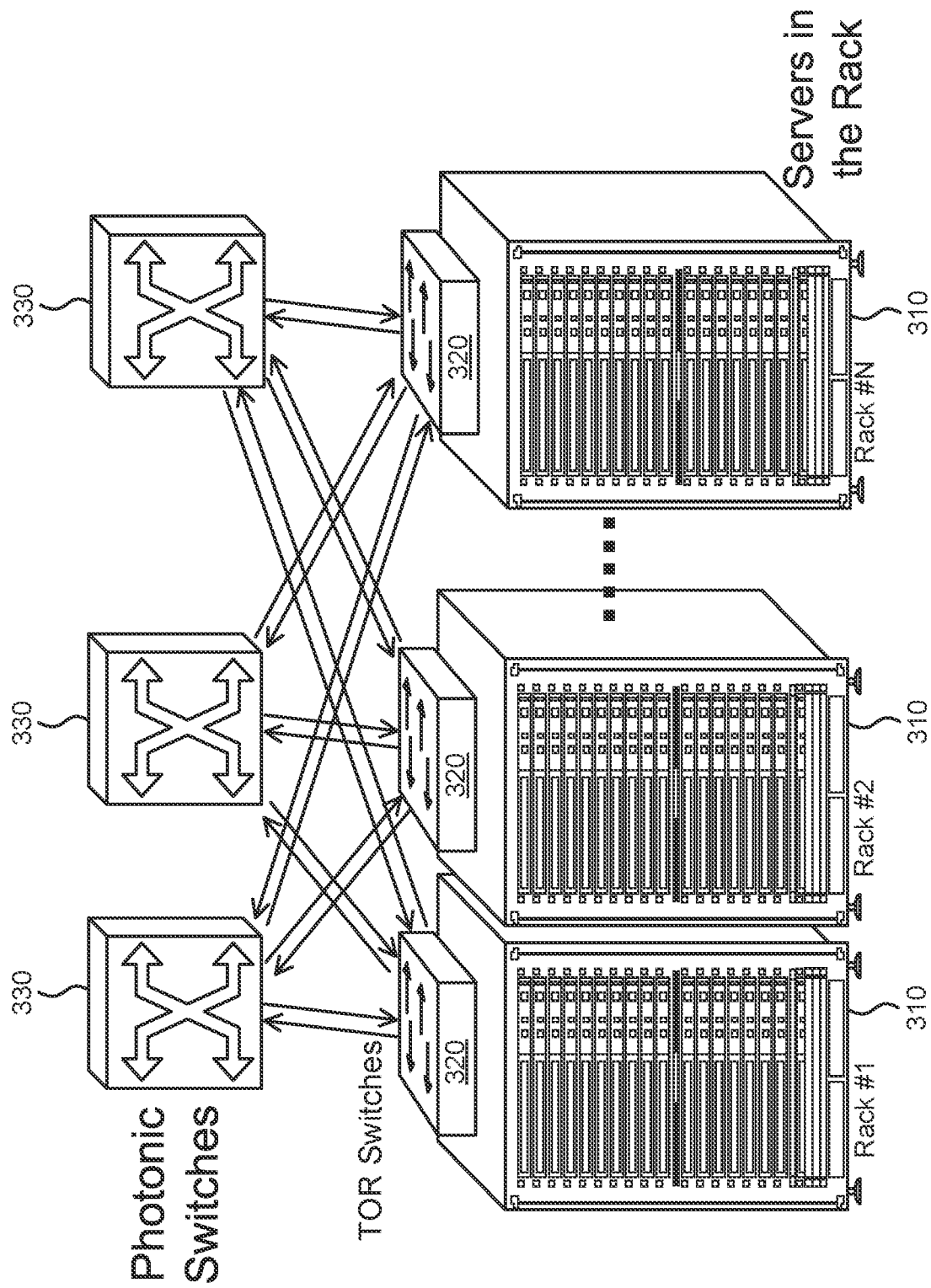
FIG. 3 illustrates a typical datacenter architecture, in which embodiments of the present invention can be implemented.

FIG. 3 illustrates a typical datacenter architecture, in which embodiments of the present invention can be implemented. The data centre includes multiple racks 310 of computing equipment, interconnected using a network of top of rack (TOR) switches 320 and photonic switches 330. This allows different pieces of the computing equipment to be interconnected during operation. The TOR switches 320 are interconnected to each other via the photonic switches 330. The photonic switches provide full programmable connectivity among these TOR switches. It is noted that as the size of the data centre grows, the number of optical input and output ports of the photonic switches, required to maintain full interconnectivity between the TOR switches, also grows. The number of input and output ports the photonic switches can easily surpass 16, 32, or even 64, depending on application requirements. For switches with large numbers of input and output ports, the optical signal loss can be more than what most transceivers can handle and hence amplification of the optical signals is required. In addition, the optical signal loss for such large switches can vary significantly depending on switching state. As mentioned above, SOAs can be used to provide such amplification, although other technologies such as Erbium doped Arbor amplifiers, and Raman amplifiers can also be used.

Figure 4:
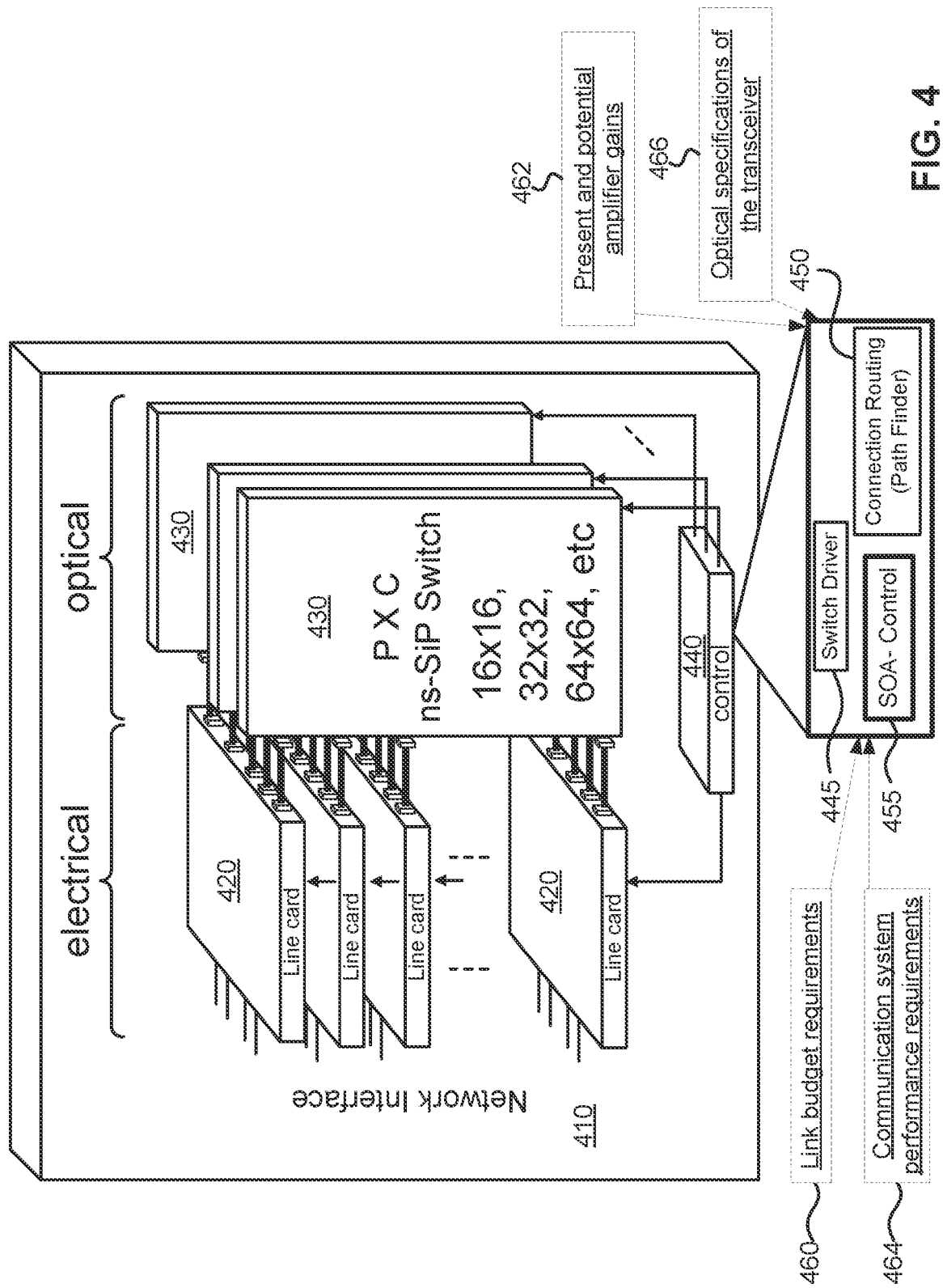
FIG. 4 illustrates a detailed view of one of the photonic switches of FIG. 3, according to an embodiment of the present invention.

FIG. 4 illustrates a detailed view of one of the photonic switches 330 of FIG. 3, according to an embodiment of the present invention. The photonic switch includes a network interface 410, a plurality of line cards 420 coupled to the network interface and operating in the electrical domain, and a plurality of photonic cross connect (PXC) optical switches 430. The switches can have a very fast (e.g. on the order of nanoseconds) switching speed and can be silicon photonics (SiP) based. The switches can have 16, 32, 64, or a different number of inputs and outputs. The controller 440 is also present and operatively coupled to the line cards and the optical switches.

The controller 440 can include a switch driver 445 which is configured to generate and provide control signals to the various optical switches in order to direct their switching state. The controller can drive each of the switching cells of the switching fabric(s) into the cross or bar states, for example. The controller can further include a connection routing component 450, which determines the desired switching state. This is also referred to as an optical path finder component. The connection routing component determines, for a given requirement of connecting input ports and output ports, a switching state configuration which establishes optical paths within the switches for satisfying the requirement. Various optical path finding routines for connecting multiple input ports and multiple output ports in a given optical switch architecture are known as would be readily understood by a worker skilled in the art.

The controller further includes an amplification state control component 455 for controlling the optical amplifiers. When the optical amplifiers are SOAs, the amplification state control component can output drive currents for setting a desired amplification state. The amplification state control component and the connection routing component can be integrated together. For example, based on the optical paths determined by the connection routing component, the amplification state control component can set optical amplification levels to an appropriate value satisfying predetermined requirements in order to compensate for signal losses due to the determined optical paths. In some embodiments, to have the optical amplifiers set at a desired optimal operation point, a link budget analysis is performed by the controller. As a result, the gains of the optical amplifiers are set based at least in part on the amount of optical signal loss introduced by the optical switch in its determined switching state.

Figure 5:
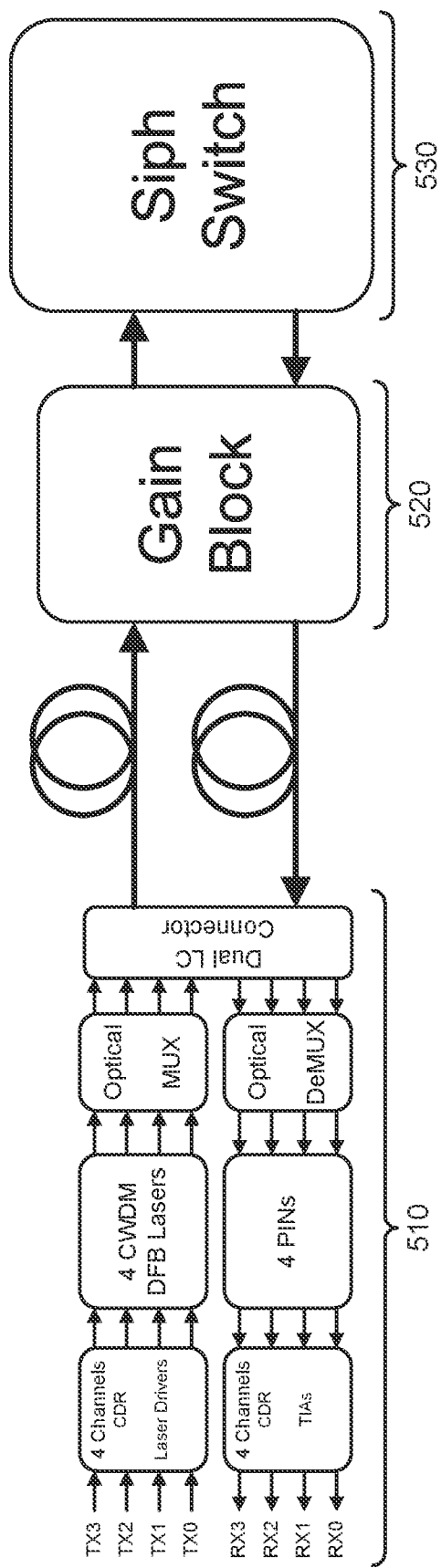
FIG. 5 illustrates a system related to the architecture of FIG. 3, according to an embodiment of the present invention.

FIG. 5 illustrates a system related to the architecture of FIG. 3, according to an embodiment of the present invention. This can be used to illustrate link budget requirements. An optical transceiver 510, such as a QSFP transceiver, receives signals for transmission and provides received signals. The optical transceiver can convert between electrical signals on the left-hand side and optical signals on the right-hand side. A gain block 520, such as an SOA or other optical amplifier, is provided which amplifies signals transmitted from the transmitter (top) part of the transceiver, signals transmitted to the receiver (bottom) part of the transceiver, or both. An optical switching fabric 530 (e.g. a SiPh switch with 32 inputs and 32 outputs) receives input signals from the gain block and provides output signals to the gain block. The optical switching fabric interconnects input signal paths to output signal paths according to a controllable switching state. Multiple gain blocks and/or transceivers can be coupled to the same optical switching fabric 530. Integration of the SOAs is performed in order to compensate for losses in the SiPh switch. The bit error rate of the transceiver depends on the receiver power or supported gain of the SOA, as well as the delivered optical signal-to-noise ratio (OSNR). It is noted that optical filters at the SOA may be omitted due to practical considerations.

Figure 6:
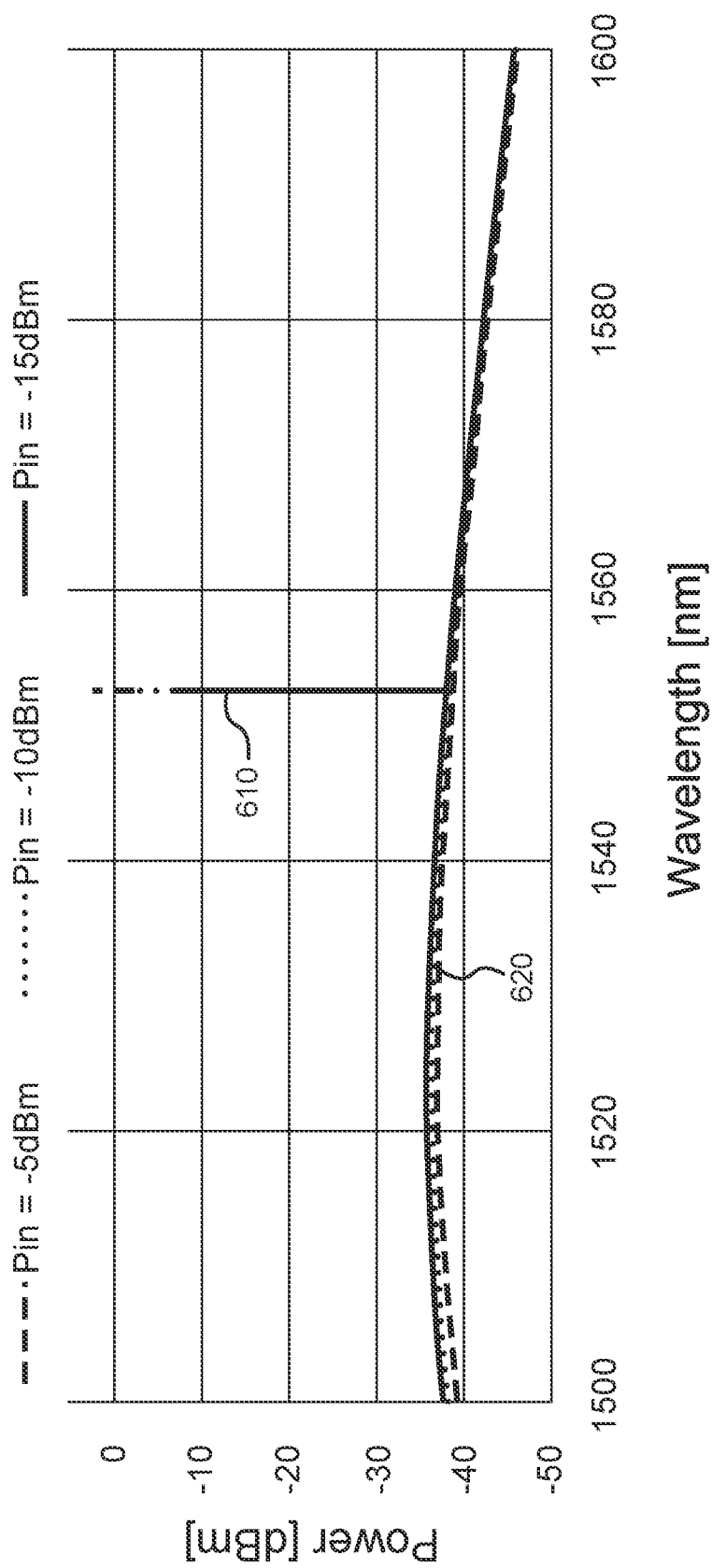
FIG. 6 illustrates a representative output spectrum for an optical amplifier, in relation to an embodiment of the present invention.

FIG. 6 illustrates a representative output spectrum for a SOA, for various input powers (Pin). The signal is illustrated in a narrow band, while output also contains a significant wideband noise component, due to ASE noise. Without filtering, this noise component can be problematic as it is injected at the target receiver and degrades the overall OSNR.

Figure 7:
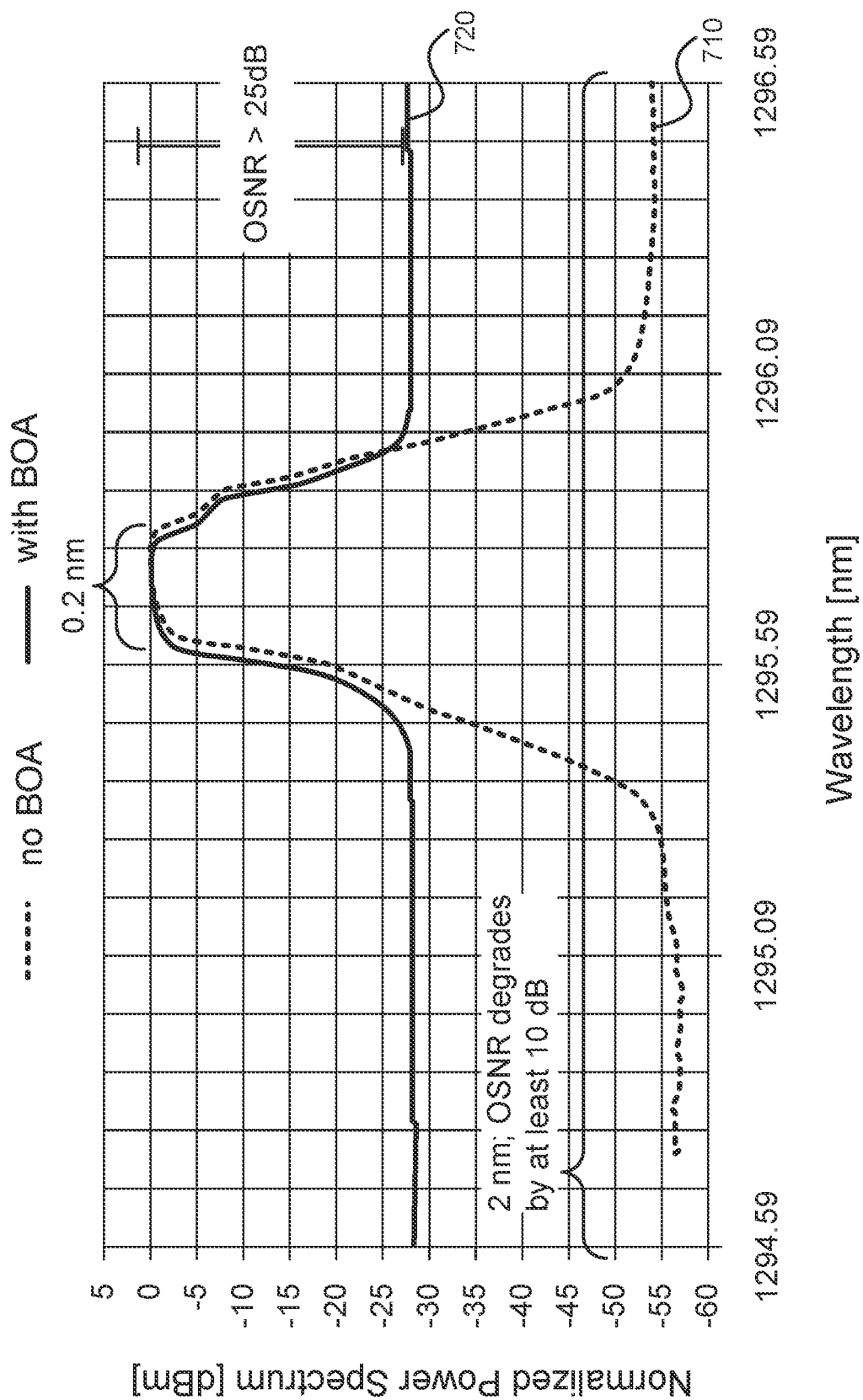
FIG. 7 illustrates the output spectrum of FIG. 6 in more detail, compared with the output spectrum prior to optical amplification.

As shown in FIG. 7, the optical signal 610 has a bandwidth of about 0.2 nm. After SOA the signal spectrum also contains the ASE 620 of the SOA. ASE of SOA is known to be wide (around 100 nm). FIG. 7 also shows the optical bandwidth of the transceiver (here QSFP illustrated in FIG. 5) is about 2 nm per channel (which is about ten times the bandwidth of the optical signal) which contains ASE flat spectrum. Therefore while the OSNR for 0.2 nm bandwidth is still high (>25 dB in the example of FIG. 7) the total ASE injected to the receiver may be significant due to large optical bandwidth at the receiver. OSNR is typically defined for 0.2 nm bandwidth or bandwidths proportional to the optical signal however this is mainly relevant when the optical bandwidth (the bandwidth of the resource carrying the optical signal) is closely matched with optical signal bandwidth. Here however the noise leaked to the receiver is impacted by the total optical bandwidth before the receiver. Hence having a 2 nm bandwidth (as compared to 0.2 nm) means that the amount of ASE injected to the receiver will be 10 times more and hence the OSNR is 10 times worse. In the context of coherent WDM transport systems ASE won't be important as the tight electrical and or optical filtering is supported by the coherent receivers. In the context of data center connectivity this doesn't hold as the cost is a big factor for transceivers. Hence coarse filtering is done and transceivers as those illustrated in FIG. 5 have large bandwidth. The bandwidth typically is large enough to accommodate the wavelength drift of the lasers during the life time of them which can be as large as 10 nm (i.e., 50 times the signal bandwidth).

FIG. 7 illustrates the output spectrum of FIG. 6 in more detail, compared with the output spectrum prior to SOA amplification. The lower curve 710 represents the spectrum of the signal as it is provided by the optical transceiver to the SOA, while the upper curve 720 represents the spectrum of the signal as it is output by the SOA. The power spectrum is normalized. For the upper curve, the OSNR is at least 25 dB, while for the lower curve, the OSNR degrades by at least 10 dB.

It is noted that SOA operation is an important consideration, as ASE noise levels injected into the communication links can cause reliability and performance issues. ASE per unit wavelength may be negligible, but when integrated over a large bandwidth, the total ASE can be significant. This can lead to OSNR degradation which can create performance instability. Tuning optical amplifier gain, e.g. by adjusting SOA drive current, can mitigate such problems.

In some embodiments, due to cost, performance and complexity requirements, optical amplifiers are only provided at the output ports of the switching fabric. This means that amplification is only supported after signal loss experienced in the switching fabric. The gain adjustment and setting of the optical amplifier depends on the loss experienced by the optical signal as it traverses between the source port and the destination port of the optical switch. The port-to-port loss is typically path dependent, although it would be desirable to have an equal port-to-port loss for all ports and optical paths coupling said ports. Some embodiments of the present invention perform gain control and/or path selection in order to at least partially equalize loss variations for different port-to-port connections, loss variations over time, or both.

Figure 8A:
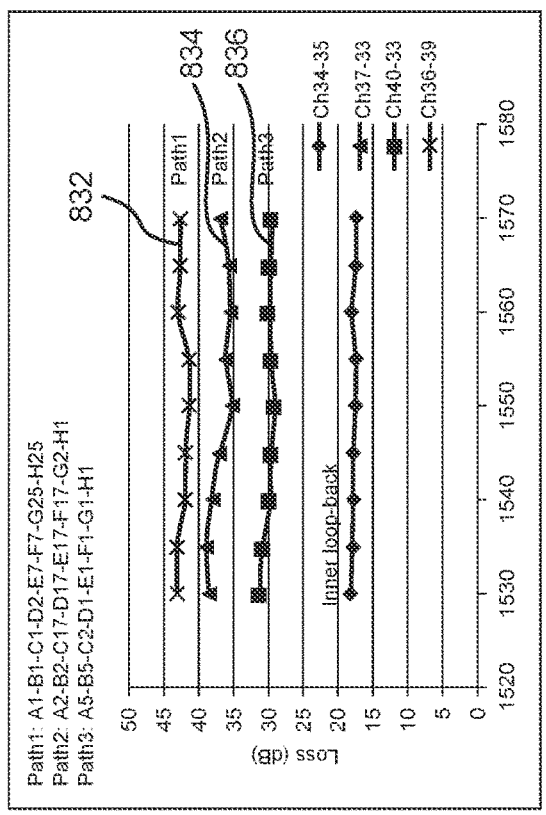
FIG. 8A illustrates an optical switching fabric with three different optical paths highlighted, in relation to an example embodiment of the present invention.
Figure 8A:
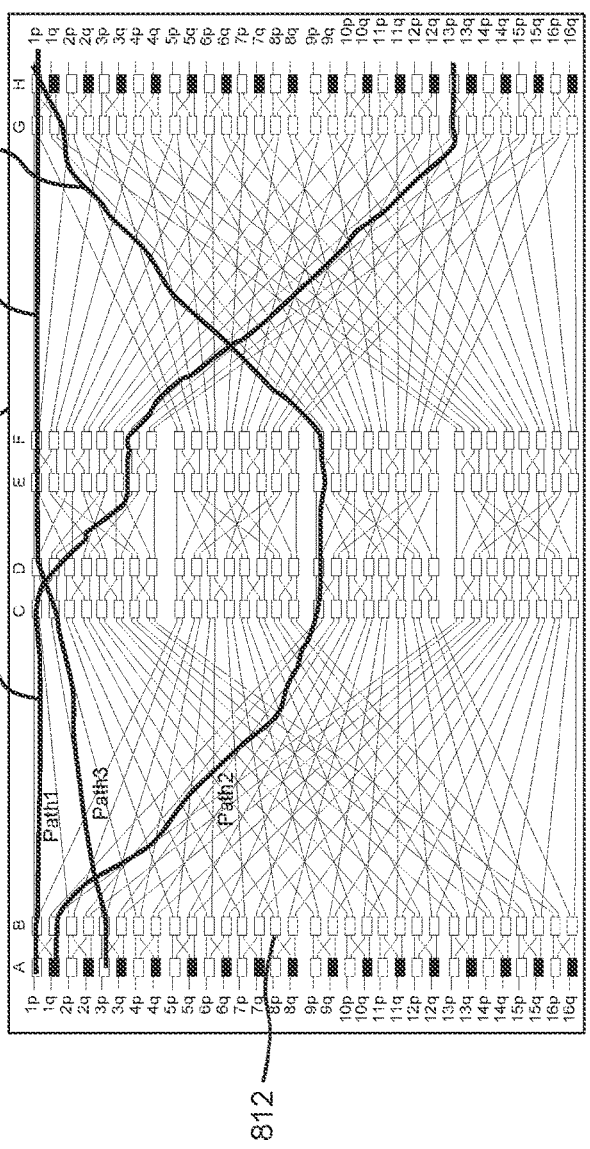

FIG. 8A illustrates an optical switching fabric 810 with three different optical paths 822, 824, 826 highlighted. The optical paths connect designated input ports to designated output ports and are established by configuration of the various switching elements 812 making up the switching fabric. As shown, the losses 832, 834, 836 (in dB) for each respective of the illustrated optical paths 822, 824, 826 are different. The illustrated difference in this example between the least-lossy and the most-lossy path is about 6 dB. This shows that path-dependent loss in the switching fabric can be significant. As such, during operation and reconfiguration of the switch, overall link budget requirements change significantly.

It has also been observed that, when ASE is filtered, optical amplification (e.g. by booster optical amplifier or BOA) can be reliably used to reduce power to a level acceptable by the transceiver's receiver component. In-band ASE noise introduced by the optical amplifier does not typically cause significant BER degradation or instability. However, when ASE is not filtered, the optical amplification requires adjusting to keep the BER at a stable level. As such, depending on the optical loss, which varies when the optical path changes, and in absence of signal filtering to remove wideband ASE or other amplifier noise, optical amplifier gain may need to be adjusted to keep BER stable.

While having optical amplification is desirable to compensate for signal attenuation experienced due to large sizes photonic switches, ASE of the amplifier impacts overall performance. Filtering of the ASE, while beneficial, imposes undesirable cost and complexity. This also makes scalability challenging especially when the transceivers rate, type and technology changes.

Figure 8B:
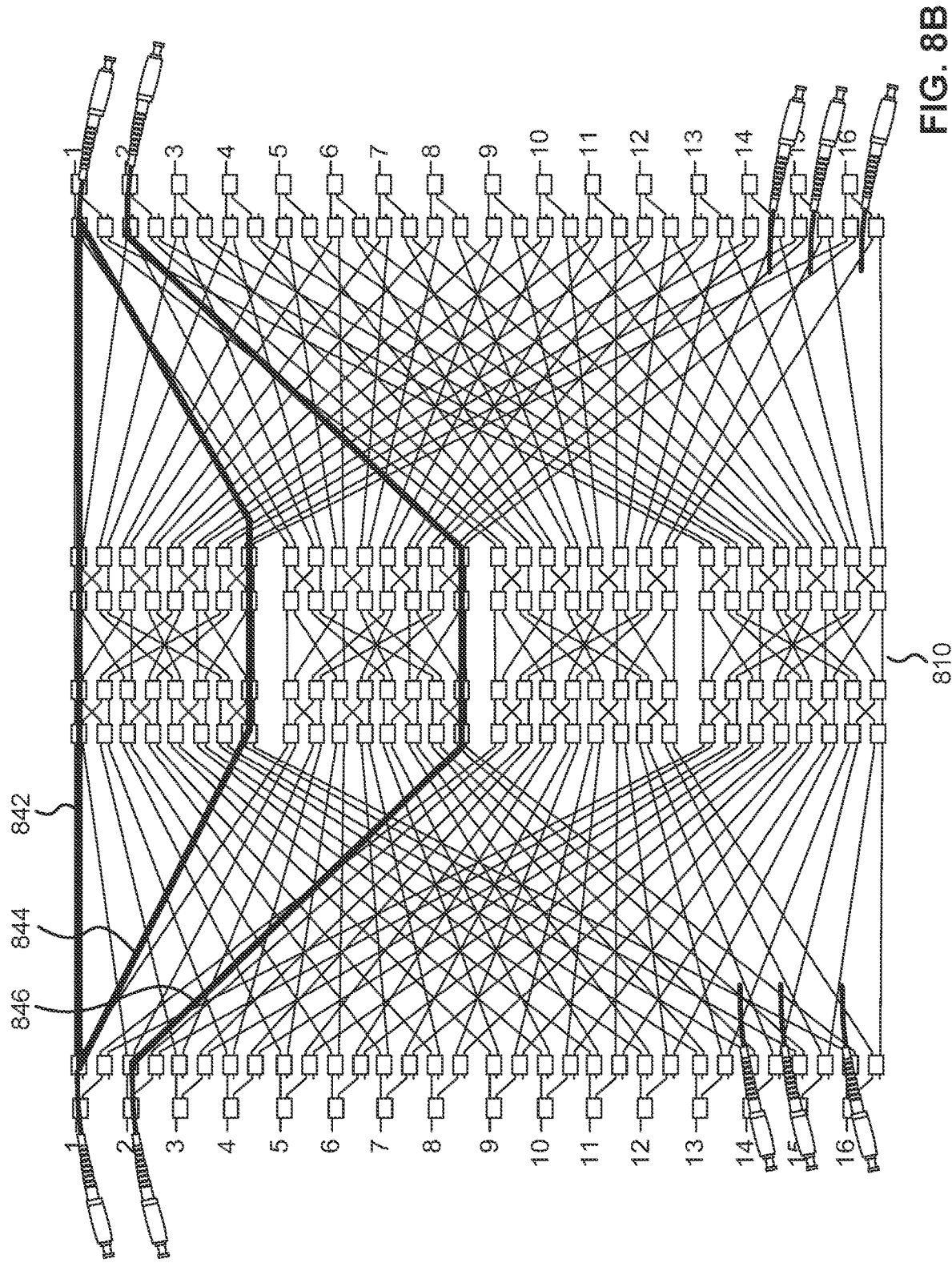
FIG. 8B illustrates an optical switching fabric with three different optical paths highlighted, in relation to another example embodiment of the present invention.

FIG. 8B illustrates an optical switching fabric 810 with three different optical paths 842, 844, 846 highlighted, in relation to another example embodiment of the present invention. The paths 842, 844 represent different paths from input port 1 to output port 1, to be implemented at different times. The path loss for optical path 842 is 9.6 dB. The path loss for optical path 844 is 13.1 dB. The path loss for optical path 844 is 16.1 dB. As such, path reconfiguration is associated with change in path loss. Without amplifier compensation, this may lead to BER penalty.

For example, in an experimental implementation for FIG. 8B, when path loss increases from 9.6 dB (for path 842) to 16.1 dB (for path 846), the drive current of a compensating optical amplifier (SOA) had to be adjusted from 91 mA to 110 mA, to retain the received signal strength at −7 dBm, in order to meet BER requirement of $10^{-6}$ bit errors per unit time. It is noted that this experimental implementation involved omission of out-of-band ASE filtering.

The table in FIG. 9A illustrates experimental results for various drive currents (first column) for the compensating SOA for the experimental implementation, with respect to path 842 in FIG. 8B. The second column illustrates the signal power at the SOA output, equivalently at the receiver input of the transceiver. The third column illustrates the BER associated with the signal at the SOA output. In more detail, SOA input signal strength is −7 dBm, transmit power is 2.6 dBm, and the desired BER is $10^{-6}$ bit errors per unit time at maximum. An upper gain threshold 600 is seen at a current value of 110 mA, corresponding to a BER which exceeds the acceptable maximum of $10^{-6}$ bit errors per unit time.

The table in FIG. 9B illustrates experimental results for various drive currents (first column) for the compensating SOA for the experimental implementation, with respect to path 844 in FIG. 8B. The second column illustrates the signal power at the SOA output. The third column illustrates the BER associated with the signal at the SOA output. In more detail, SOA input signal strength is −10.5 dBm, transmit power is 2.6 dBm, and the desired BER is $10^{-6}$ bit errors per unit time at maximum. An upper gain threshold 610 is seen at a current value of >100 mA with a lower gain threshold 615 at a current value of 71 mA, each threshold corresponding to a BER which exceeds the acceptable maximum of $10^{-6}$ bit errors per unit time.

Figure 9C:
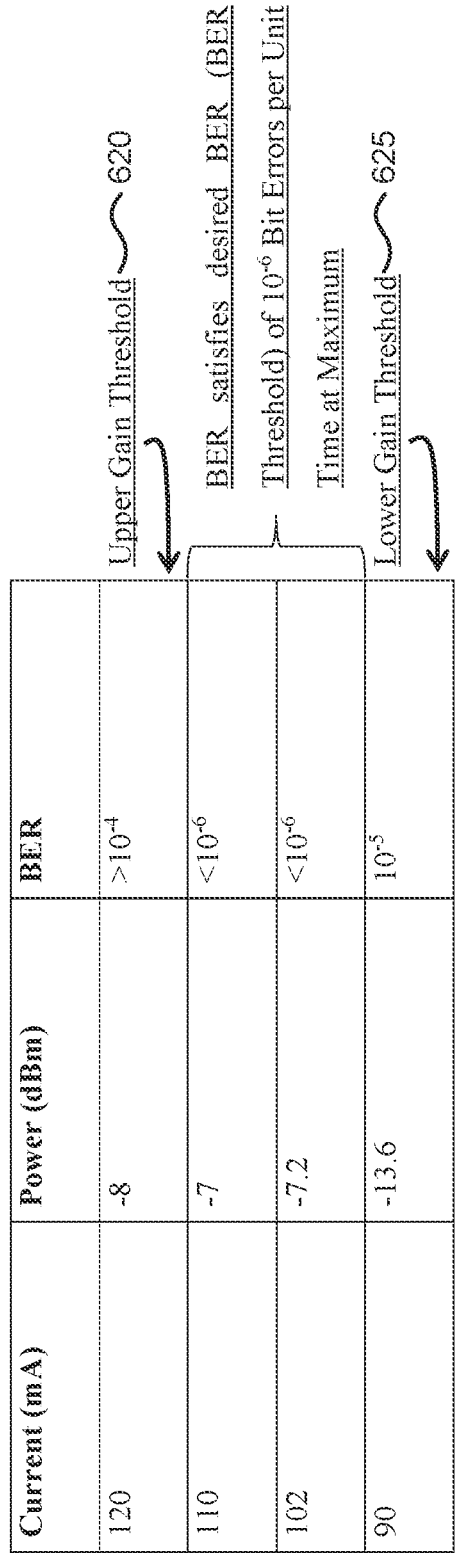
FIG. 9C illustrates, in tabulated format, experimental results for various drive currents and their respective amplification and error rates in yet another optical path.

The table in FIG. 9C illustrates experimental results for various drive currents (first column) for the compensating SOA for the experimental implementation, with respect to path 846 in FIG. 8B. The second column illustrates the signal power at the SOA output. The third column illustrates the BER associated with the signal at the SOA output. In more detail, SOA input signal strength is −13.5 dBm, transmit power is 2.6 dBm, and the desired BER is $10^{-6}$ bit errors per unit time at maximum. An upper gain threshold 620 is seen at a current value of 120 mA with a lower gain threshold 625 at a current value of 90 mA, each threshold corresponding to a BER which exceeds the acceptable maximum of $10^{-6}$ bit errors per unit time.

In some embodiments, reconfiguration of the link budget requirements for the optical amplifier can change to meet the target performance of the optical switch or system when optical paths change. Reconfiguration of optical path changes the optical path loss (attenuation). Concurrently adjusting the optical amplification allows for BER to stabilize.

Non-uniform path losses in photonic switches lead to a control requirement for optical amplification assisted switches. This is true when the non-uniformity is across ports, over time, or both. While fast photonic switching enables high throughput, for example in data center applications, it also imposes considerable design challenges when amplifiers such as SOAs are employed. ASE noise introduces by SOAs can degrade the performance in terms of BER, and hence impact the link budget of the overall photonic system.

Embodiments of the present invention provide for transparency during switch reconfiguration in the photonic layer, in the sense that performance penalty due to the reconfiguration is mitigated. This means that when port-to-port mappings change in the switch, optical amplifiers adjust as needed to support link budget requirements. A controller handles switch reconfiguration and amplification control together, to enable a transparent and stable reconfiguration.

In some embodiments, physical layer specifications of the photonic switch are incorporated into the controller. The controller then performs the switch reconfiguration and amplification control based in part on the physical layer specifications, in order to achieve a desired link budget and/or BER. In particular, the controller adjusts operation of the optical amplifiers as required to limit or minimize performance degradation due to switching fabric reconfigurations (e.g. path changes). In some embodiments, when the photonic switch is reconfigured (e.g. periodically or on a frame-by-frame basis) with respect to optical paths, the controller determines whether optical amplifier gain requires adjusting to meet desired link budget requirements to support a target BER. If so, the adjustment is made. In some embodiments, the reconfiguration is performed so that adjusting the optical amplifier gains is not required, or is minimally required.

In some embodiments, the controller tunes the optical amplifiers during the reconfigurations to provide a guaranteed minimum performance, for example in terms of BER or signal level. In some embodiments, knowledge of the optical amplifier behavior can be integrated in the controller (e.g. reconfiguration module) which determines a switching state satisfies port-to-port connectivity requirements while involving limited or minimal adjustment in the optical amplifier gains and hence supports a more reliable system. Because reconfiguring a photonic switch creates a path dependent loss, the optical amplifiers may be proportionally managed for the reconfiguration to meet a desired link budget for transparent performance. As such, control may be augmented with the knowledge of the SOA performance in conjunction with the transceiver link budget.

As explained above, embodiments of the present invention rely on the link budget information of the system where the behavior of the optical amplifier performance in conjunction with the desired transceiver is known to the controller. The controller then employs this knowledge to perform adjustment if necessary during the reconfiguration. Upon receiving a switching state reconfiguration request (e.g. a new port-to-port mapping request), the controller may decide if the selected path requires adjustment to amplifier gains while establishing the connectivity. The controller may then generate and provide the appropriate optical amplifier control signals, if needed. The signal for reliable link-budget may be sent to the controller. This will lead to switch performance (e.g. OSNR) being adequate once the channel is setup in that path. Calibration data or measurement of the path loss can be used for the evaluation.

Amplifier adjustment can be performed during or before the switching state reconfiguration or even after reconfiguration so that, for the new mapping of switch connectivity, the link budget is respected and transparent connectivity is available.

Various embodiments of the present invention utilize real and/or virtual computer resources. Such computer resources utilize, at a hardware level, a set of one or more microprocessors operatively coupled to a corresponding set of memory components which include stored program instructions for execution by the microprocessors. Computing resources may be used to provide virtual computing resources at one or more levels of virtualization. For example, one or more given generic computer hardware platforms may be used to provide one or more virtual computing machines. Computer hardware, such as processor resources, memory, and the like, may also be virtualized in order to provide resources from which further virtual computing machines are built. A set of computing resources which are allocable for providing various computing resources which in turn are used to realize various computing components of a system, may be regarded as providing a distributed computing system, the internal architecture of which may be configured in various ways.

Embodiments of the present invention comprise a computer system having a processor operatively coupled to memory, where the memory holds program instructions for execution by the processor for performing automatic anomaly detection. According to other embodiments, a hardware implementation rather than a computer processor implementation may be provided. For example, using FPGAs (field-programmable gate arrays), automatic anomaly detection procedures can be encoded into silicon chips. Such an embodiment may run much faster than software implementations. At the same time, algorithm parameters in hardware-only embodiments may be more difficult to tune than those in computer processor embodiments. A controller for an optical switch may be implemented using such electronic hardware components. The controller may be configured to control switching fabric drivers and optical amplifier drivers, and may be operatively coupled to such drivers. The drivers may be other electronic devices, such as controllable current and/or voltage sources.

FIG. 10 is a schematic diagram of an electronic device 900 that may perform any or all of operations of the above methods and features explicitly or implicitly described herein, according to different embodiments of the present invention. The electronic device may be a controller for an optical switch.

As shown, the device includes a processor 910, memory 920, non-transitory mass storage 930, I/O interface 940, network interface 950, and a transceiver 960, all of which are communicatively coupled via bi-directional bus 970. According to certain embodiments, any or all of the depicted elements may be utilized, or only a subset of the elements. Further, the device 900 may contain multiple instances of certain elements, such as multiple processors, memories, or transceivers. Also, elements of the hardware device may be directly coupled to other elements without the bi-directional bus. Additionally or alternatively to a processor and memory, other electronics, such as integrated circuits, may be employed for performing the required logical operations.

The memory 920 may include any type of non-transitory memory such as static random access memory (SRAM), dynamic random access memory (DRAM), synchronous DRAM (SDRAM), read-only memory (ROM), any combination of such, or the like. The mass storage element 930 may include any type of non-transitory storage device, such as a solid state drive, hard disk drive, a magnetic disk drive, an optical disk drive, USB drive, or any computer program product configured to store data and machine executable program code. According to certain embodiments, the memory 920 or mass storage 930 may have recorded thereon statements and instructions executable by the processor 910 for performing any of the aforementioned method operations described above. Additionally or alternatively, hardware processing components such as FPGAs or other hardware logic circuitry can be provided and configured for performing such operations.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Further, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

What is claimed is:

1. A controller for an optical switch, the optical switch comprising a switching fabric controllable to route optical signals from input ports to output ports, and one or more optical amplifiers for amplifying one or more of said optical signals, the controller comprising processing electronics and a control output, and configured to:
generate a configuration for the switching fabric, the configuration indicating a selected set of optical paths between the input ports and the output ports, wherein optical path losses through the switching fabric vary based on the configuration;
provide, at the control output, a switching fabric control signal for implementing the configuration for the switching fabric; and
generate and provide, at the control output, an amplifier control signal for controlling gains of the one or more optical amplifiers, to cause the gains to be above a lower gain threshold and below an upper gain threshold;
wherein the configuration for the switching fabric is generated based at least in part on the gains of the one or more optical amplifiers, the amplifier control signal is generated based on the configuration for the switching fabric, or both;
wherein the amplifier control signal is generated based at least in part on optical specifications of a transceiver operatively coupled to the optical switch;
wherein for each one of the optical signals, the transceiver has a corresponding optical bandwidth wider than a bandwidth of said one of the optical signals;
wherein the lower gain threshold is configured so that causing the gains to be above the lower gain threshold results in the amplified optical signals being sufficiently strong that a bit error rate of the transceiver is below a first bit error rate threshold; and
wherein the upper gain threshold is configured so that causing the gains to be below the upper gain threshold results in amplified spontaneous emission (ASE) noise of the optical amplifiers being sufficiently low that the bit error rate is below a second the bit error rate threshold.

2. The controller of claim 1, wherein generating the amplifier control signal comprises:
maintaining a prior amplifier control signal as the amplifier control signal when applying the prior amplifier control signal along with the configuration for the switching fabric results in a path loss for the optical switch being below a predetermined threshold, and updating the amplifier control signal otherwise, wherein the prior amplifier control signal controls gains of the one or more optical amplifiers during implementation of a prior configuration for the switching fabric, the prior configuration being immediately prior to the configuration for the switching fabric.

3. The controller of claim 1, wherein the configuration for the switching fabric is generated independently of the gains of the one or more optical amplifiers and the amplifier control signal is generated based on the configuration for the switching fabric.

4. The controller of claim 1, wherein the configuration for the switching fabric is generated based at least in part on the gains of the one or more optical amplifiers.

5. The controller of claim 4, further configured to select the configuration for the switching fabric to avoid or limit a requirement to change the gains of the one or more optical amplifiers, said requirement being necessary to maintain a predetermined performance level for the optical switch.

6. The controller of claim 1, wherein generating the configuration for the switching fabric and generating the amplifier control signal is based on a requirement to maintain a predetermined performance metric for the optical switch.

7. The controller of claim 6, wherein the performance metric includes one or more of: the bit error rate being below the first bit error rate threshold; an optical signal level being above a first specified threshold; an optical signal to noise ratio being above a second specified threshold; and an optical path loss being below a third specified threshold.

8. The controller of claim 1, wherein the optical amplifiers are semiconductor optical amplifiers.

9. The controller of claim 1, wherein the optical amplifiers are wideband, unfiltered amplifiers.

10. The controller of claim 1, wherein the configuration for the switching fabric, the amplifier control signal, or both, are generated based at least in part on one or more of: link budget requirements; communication system performance requirements; optical specifications of the switch; and optical specifications of optical components coupled to the switch.

11. A method for controlling an optical switch, the optical switch comprising a switching fabric controllable to route optical signals from input ports to output ports, and one or more optical amplifiers for amplifying one or more of said optical signals, the method comprising:
generating a configuration for the switching fabric, the configuration indicating a selected set of optical paths between the input ports and the output ports, wherein optical path losses through the switching fabric vary based on the configuration;
providing a switching fabric control signal for implementing the configuration for the switching fabric; and
generating and providing an amplifier control signal for controlling gains of the one or more optical amplifiers, to cause the gains to be above a lower gain threshold and below an upper gain threshold,
wherein the configuration for the switching fabric is generated based at least in part on the gains of the one or more optical amplifiers, the amplifier control signal is generated based on the configuration for the switching fabric, or both;
wherein the amplifier control signal is generated based at least in part on optical specifications of a transceiver operatively coupled to the optical switch;
wherein the transceiver has an optical bandwidth wider than a bandwidth of all of said optical signals in combination;
wherein the lower gain threshold is configured so that causing the gains to be above the lower gain threshold results in the amplified optical signals being sufficiently strong that a bit error rate of the transceiver is below a first bit error rate threshold; and
wherein the upper gain threshold is configured so that causing the gains to be below the upper gain threshold results in amplified spontaneous emission (ASE) noise of the optical amplifiers being sufficiently low that the bit error rate is below the bit error rate threshold.

12. The method of claim 11, wherein generating the amplifier control signal comprises:

maintaining a prior amplifier control signal as the amplifier control signal when applying the prior amplifier control signal along with the configuration for the switching fabric results in a path loss for the optical switch being below a predetermined threshold, and updating the amplifier control signal otherwise, wherein the prior amplifier control signal controls gains of the one or more optical amplifiers during implementation of a prior configuration for the switching fabric, the prior configuration being immediately prior to the configuration for the switching fabric.

13. The method of claim 11, wherein the configuration for the switching fabric is generated independently of the gains of the one or more optical amplifiers and the amplifier control signal is generated based on the configuration for the switching fabric.

14. The method of claim 11, wherein the configuration for the switching fabric is generated based at least in part on the gains of the one or more optical amplifiers.

15. The method of claim 14, further comprising selecting the configuration for the switching fabric to avoid or limit a requirement to change the gains of the one or more optical amplifiers, said requirement being necessary to maintain a predetermined performance level for the optical switch.

16. The method of claim 11, wherein generating the configuration for the switching fabric and generating the amplifier control signal is based on a requirement to maintain a predetermined performance metric for the optical switch.

17. The method of claim 16, wherein the performance metric includes one or more of: the bit error rate being below the first bit error rate threshold; an optical signal level being above a first specified threshold; an optical signal to noise ratio being above a second specified threshold; and an optical path loss being below a third specified threshold.

18. The method of claim 11, wherein the optical amplifiers are semiconductor optical amplifiers.

19. The method of claim 11, wherein the optical amplifiers are wideband, unfiltered amplifiers.

20. The method of claim 11, wherein the configuration for the switching fabric, the amplifier control signal, or both, are generated based at least in part on one or more of: link budget requirements; communication system performance requirements; optical specifications of the switch; and optical specifications of optical components coupled to the switch.

* * * * *